US 12,445,745 B2

(12) United States Patent
Liu (10) Patent No.: US 12,445,745 B2
(45) Date of Patent: Oct. 14, 2025

(54) IMAGE SENSOR AND PIXEL-LEVEL EXPOSURE CONTROL METHOD

(71) Applicant: Shenzhen MetaSilicon Co., Ltd., Shenzhen (CN)

(72) Inventor: Ming Liu, Shenzhen (CN)

(73) Assignee: Shenzhen MetaSilicon Co., Ltd., Shenzhen (CN)

( * ) Notice: Subject to any disclaimer, the term of this patent is extended or adjusted under 35 U.S.C. 154(b) by 259 days.

(21) Appl. No.: 18/327,769

(22) Filed: Jun. 1, 2023

(65) Prior Publication Data

US 2024/0064423 A1 Feb. 22, 2024

(30) Foreign Application Priority Data

Aug. 17, 2022 (CN) .......................... 202210987895.7

(51) Int. Cl.
*H04N 25/535* (2023.01)
*G06V 10/20* (2022.01)
*G06V 10/26* (2022.01)
*H04N 23/73* (2023.01)
*H04N 23/741* (2023.01)
*H04N 25/583* (2023.01)

(52) U.S. Cl.
CPC ......... *H04N 25/535* (2023.01); *G06V 10/255* (2022.01); *G06V 10/26* (2022.01); *H04N 23/73* (2023.01); *H04N 23/741* (2023.01); *H04N 25/583* (2023.01)

(58) Field of Classification Search
CPC .. H04N 23/741; H04N 25/535; G06V 10/255; G06V 10/26
See application file for complete search history.

(56) References Cited

U.S. PATENT DOCUMENTS

| | | | | |
|---|---|---|---|---|
| 12,108,141 | B2 * | 10/2024 | Berkovich | H04N 23/11 |
| 2017/0142313 | A1 * | 5/2017 | Gren | H04N 25/78 |
| 2018/0285679 | A1 * | 10/2018 | Amitay | G06T 5/90 |
| 2020/0068137 | A1 * | 2/2020 | von Fintel | H04N 23/62 |

FOREIGN PATENT DOCUMENTS

| | | |
|---|---|---|
| CN | 106454148 A1 | 2/2017 |
| CN | 106559622 A | 4/2017 |
| CN | 112437236 A1 | 3/2021 |
| CN | 112449120 A1 | 3/2021 |

* cited by examiner

*Primary Examiner* — Lin Ye
*Assistant Examiner* — Chriss S Yoder, III
(74) *Attorney, Agent, or Firm* — Kolitch Romano Dascenzo Gates LLC (57) ABSTRACT

An image sensor includes a two-dimensional pixel array including a plurality of sensor pixels, wherein the sensor pixels are configured to collect image data of a target scene according to an adjustable exposure time; an image segmentation module configured to analyze image data collected by the two-dimensional pixel array, extract image features and establish a plurality of pixel partitions based on sensor pixels with same image features; a prediction module configured to obtain a predicted exposure time according to image features of pixel partitions; and a regional exposure control module configured to generate a control signal for an exposure time according to the predicted exposure time, and send the control signal to sensor pixels of a pixel partition corresponding to the predicted exposure time.

14 Claims, 10 Drawing Sheets

FIG. 1 (Prior Art)

TX signal

IMAGE SENSOR AND PIXEL-LEVEL EXPOSURE CONTROL METHOD

CROSS-REFERENCE TO RELATED APPLICATION

This application is based upon and claims priority to Chinese Patent Application No. 202210987895.7, filed on Aug. 17, 2022, the entire contents of which are incorporated herein by reference.

TECHNICAL FIELD

The present disclosure relates generally to the field of photosensitive image sensors and more particularly to an image sensor and a pixel-level exposure control method.

BACKGROUND

The dynamic range (DR) is the signal range between the maximum light intensity and the minimum light intensity that the image sensor can be simultaneously detected in the one frame image, and it is one of the most important parameters of a complementary metal oxide semiconductor (CMOS) image sensor (CIS).

Due to the limitation of pixel full well capacity, the limitation of exposure time as well as noise, the dynamic range of ordinary CIS is generally 60-70 dB. In some specific applications, such as security monitoring and autonomous driving with complex ambient light, image sensors are often required to have high dynamic range (HDR) imaging capability greater than 100 dB.

Figure 1:
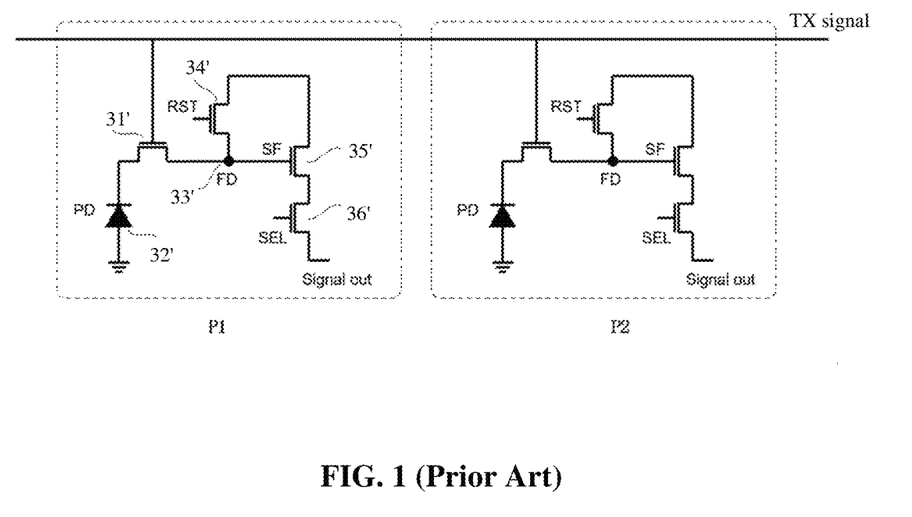
FIG. 1 is a schematic circuit diagram of an image sensor in the prior art.
Figure 2:
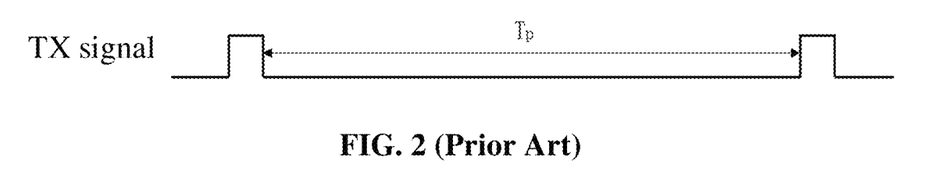
FIG. 2 is a schematic diagram of exposure timing control of an image sensor in the prior art.

FIG. 1 is a schematic diagram of a pixel architecture of an image sensor in the prior art, and FIG. 2 is a schematic diagram of exposure timing control of an image sensor in the prior art. As shown in FIG. 1 and FIG. 2, an image sensor in the prior art mainly includes the following devices: a photodiode (PD) 32' used to accumulate electrons generated by the photoelectric effect; a transfer transistor (TX) 31' used to transfer electrons generated in the PD to a floating diffusion (FD) 33'; a reset transistor (RST) 34' used to clear the electrons stored in the PD and the FD; a source follower (SF) transistor 35' used to amplify the voltage signal generated by the FD and a select (SEL) transistor 36' used to select the pixel whose signal needs to be read out. For traditional CIS, since the exposure time of the first pixel P1 and the second pixel P2 are controlled by a same TX signal, the exposure time of the two pixels is the same, that is, the traditional CIS cannot control the exposure time at the pixel level.

At present, some technical solutions for extending the dynamic range have been disclosed, but each solution has disadvantages in terms of functionality, usage scenarios or cost. Some of the disadvantages are as follows:
1. Time-domain multiple exposure, one of the common dynamic range extension technologies, performs multiple exposures of different time lengths on the same target scene, and then fuses multiple frames of images obtained by multiple exposures. The disadvantage of this method is that the subjects cannot move during multiple exposures, otherwise it will cause motion artifacts. Therefore, it is not suitable for applications requiring high-speed photography such as vehicle cameras.
2. Multiple exposures in the spatial region of a single frame can reduce motion artifacts. A typical approach is to divide the pixel array into rows and set long exposure and short exposure at intervals of two rows. When the shutter is pressed, the long exposure and short exposure are turned on simultaneously. This method takes long exposure image and short exposure image at once, and finally obtains a HDR image. The disadvantage of this method is that it will sacrifice the spatial resolution of the sensor due to fusing the data obtained by the pixels with long exposure and short exposure.
3. Another method uses two different photodiodes with different photoresponsivity in a pixel unit of CIS to extend the dynamic range. The photodiode having high photoresponsivity is responsible for the dark part imaging and the photodiode having low photoresponsivity is responsible for the bright part imaging. However, this approach cannot be applied to image sensors with small pixels (each pixel unit actually contains two pixels).

The shortcomings of HDR in the prior art are as follows:
1. Motion artifact is easily caused, and/or, the resolution of CIS is sacrificed; and
2. The dynamic range achieved is limited (about 120-130 dB), which cannot meet the applications requiring DR greater than 140 dB, such as autonomous driving etc.

Therefore, the present disclosure provides an image sensor and a pixel-level exposure control method to address at least some issues discussed above.

SUMMARY

In order to overcome the current technical hurdles, the present disclosure provides an image sensor and a pixel-level exposure control method, which realizes single-frame ultra-high dynamic range imaging, effectively reduces motion artifacts, and is suitable for high-speed photography. In addition, the resolution of the sensor will not be reduced, which is conducive to compatibility with small-size pixels, that is, the cost of the chips with the same resolution can be reduced.

The present disclosure provides an image sensor including:
- a two-dimensional pixel array including a plurality of sensor pixels, wherein the sensor pixels are configured to collect image data of a target scene according to an adjustable exposure time;
- an image segmentation module configured to analyze image data collected by the two-dimensional pixel array, extract image features and establish a plurality of pixel partitions based on sensor pixels with same image features;
- a prediction module configured to obtain a predicted exposure time according to image features of pixel partitions; and
- a regional exposure control module configured to generate a control signal for an exposure time according to the predicted exposure time, and send the control signal to sensor pixels of a pixel partition corresponding to the predicted exposure time.

In some embodiments of the present disclosure, the sensor pixel includes:
- a photodiode;
- a floating diffusion;
- a transfer transistor having a source and a drain coupled to the photodiode and the floating diffusion respectively; and
- a transfer gate control unit coupled to a gate of the transfer transistor, and the sensor pixels are configured that electrons accumulated by the photodiode during exposure are transferred to the floating diffusion only when the transfer transistor and the transfer gate control unit are simultaneously turned on.

In some embodiments of the present disclosure, the transfer gate control unit is a control circuit composed of a transistor or several transistors.

In some embodiments of the present disclosure, the image segmentation module inputs the image data into an image segmentation neural network model, and outputs a plurality of pixel partitions, each pixel partition includes image pixels with same image features, and the image features include one or more of grayscale, color, spatial texture and geometric shape.

In some embodiments of the present disclosure, the prediction module obtains a predicted exposure time according to the image features of a pixel partition, and establishes a mapping relationship between the predicted exposure time and a sensor pixel in the pixel partition.

In some embodiments of the present disclosure, the regional exposure control module generates a pulse signal according to the predicted exposure time, a duration between falling edge and end of a cycle of the pulse signal is equal to the predicted exposure time, then sends each pulse signal to a sensor pixel that mapped to the predicted exposure time, each of the sensor pixels is exposed according to the predicted exposure time included in the pulse signal.

In some embodiments of the present disclosure, the image sensor further includes a first buffer, which buffers a dynamic image of a previous frame as the image data, and establishes a mapping relationship between each image pixel in the dynamic image of the previous frame and a sensor pixel;
the regional exposure control module sends an exposure control signal to a sensor pixel having a mapping relationship with the predicted exposure time.

In some embodiments of the present disclosure, the image sensor further includes a second buffer, which buffers a low-resolution image data captured by part of pixels in the sensor, and establishes a mapping relationship between image pixels in captured image and sensor pixels according to positions of sensor pixels corresponding to the part of pixels in the image sensor;
the regional exposure control module sends an exposure control signal to a sensor pixel having a mapping relationship with the predicted exposure time.

The present disclosure also provides a pixel-level exposure control method including steps of:
capturing a sampled image and establishing a mapping relationship between image pixels of the sampled image and at least one sensor pixel;
segmenting the sampled image and establishing a plurality of pixel partitions based on image features of the image pixels;
obtaining a predicted exposure time for each pixel partition and obtaining an exposure control signal according to the predicted exposure time;
sending the exposure control signal to a sensor pixel having a mapping relationship with the predicted exposure time in a pixel partition; and obtaining a high dynamic range image of a current frame.

In some embodiments of the present disclosure, steps of capturing the sampled image and establishing the mapping relationship between image pixels of the sampled image and at least one sensor pixel include:
using a dynamic image of a previous frame as the sampled image, and establishing the mapping relationship between image pixels of the dynamic image of the previous frame and sensor pixels.

In some embodiments of the present disclosure, steps of capturing the sampled image and establishing the mapping relationship between image pixels of the sampled image and at least one sensor pixel include:
using part of pixels in the sensor to capture a low-resolution sampled image, and establishing the mapping relationship between each image pixel of the sampled image and sensor pixels according to the positions of the part of pixels in the image sensor.

In some embodiments of the present disclosure, steps of segmenting the sampled image and establishing a plurality of pixel partitions based on image features of the image pixels include:
inputting the sampled image into an image segmentation neural network model and outputting a plurality of pixel partitions, wherein each pixel partition includes image pixels with a same brightness.

In some embodiments of the present disclosure, steps of segmenting the sampled image and establishing a plurality of pixel partitions based on image features of the image pixels include:
obtaining a brightness reference of each image pixel in the sampled image, and allocating the image pixels to different pixel partitions, wherein each pixel partition corresponds to a preset independent range of brightness reference.

In some embodiments of the present disclosure, a step of obtaining the predicted exposure time for each pixel partition includes:
inputting each pixel partition respectively into an exposure module to obtain a predicted exposure time of each pixel partition, and a range of the predicted exposure time is $1/10$ second to $1/1000$ second.

In some embodiments of the present disclosure, a step of obtaining the exposure control signal according to the predicted exposure time includes:
generating a pulse signal according to the predicted exposure time, wherein a duration between falling edge and end of a cycle of the pulse signal is equal to the predicted exposure time.

In some embodiments of the present disclosure, the method further includes steps of:
identifying and partitioning obstacle in a dynamic image of the current frame through a trained neural network model;
an identified image region or an image region whose confidence level is lower than a preset threshold is set as an exposure region to be adjusted, and a predicted exposure time of pixels in the exposure region is adjusted in a next frame.

The purpose of the present disclosure is to provide an image sensor and a pixel-level exposure control method, which can realize single-frame ultra-high dynamic range imaging, effectively reduces motion artifacts, and is suitable for high-speed photography. In addition, the resolution of the sensor will not be reduced, which is conducive to compatibility with small-size pixels, that is, the cost of the chips with the same resolution can be reduced.

BRIEF DESCRIPTION OF THE DRAWINGS

In order to more clearly illustrate technical solutions in the embodiments of the present disclosure, the drawings used in the description of the embodiments are briefly described below. Obviously, the drawings in the following description are merely some embodiments of the present disclosure. Those skilled in the art can also obtain other drawings based on these drawings without any creative labor.

DETAILED DESCRIPTION

To better illustrate the purpose of the present disclosure, technical proposal and advantages thereof, embodiments of the present disclosure will be described in detail with reference to the drawings. It should be readily understood that both the embodiments and the drawings are explanatory for the present disclosure only, and are not intended as a limitation on the scope of the present disclosure.

Figure 3:
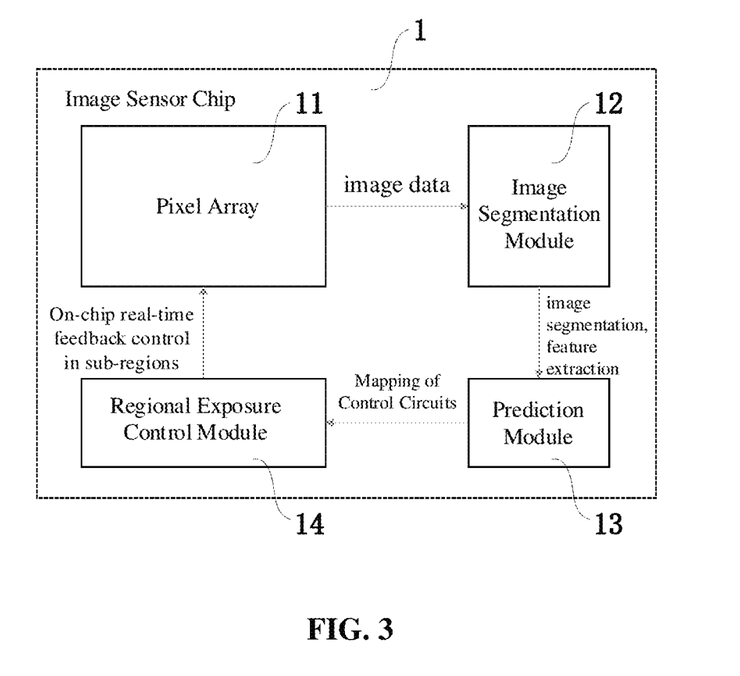
FIG. 3 is a module diagram of an image sensor according to an embodiment of the present disclosure.

FIG. 3 is a module diagram of an image sensor according to an embodiment of the present disclosure. As illustrated in FIG. 3, an image sensor 1 in the present disclosure includes a two-dimensional pixel array 11, an image segmentation module 12, a predicting module 13 and a regional exposure control module. The two-dimensional pixel array 11 includes a plurality of sensor pixels, and the sensor pixels are configured to collect image data of a target scene according to an adjustable exposure time. The image segmentation module 12 is configured to analyze image data collected by the two-dimensional pixel array 11, extract image features and establish a plurality of pixel partitions based on sensor pixels with same image features. The prediction module 13 is configured to obtain a predicted exposure time according to image features of pixel partitions. And the regional exposure control module 14 is configured to generate a control signal for an exposure time according to the predicted exposure time, and send the control signal to sensor pixels of a pixel partition corresponding to the predicted exposure time.

Referring to FIG. 3, the image sensor integrates a low-power image processing engine, performs image segmentation and image feature extraction through the image segmentation module, and then calculates the exposure time at pixel-level and controls the exposure time, finally, single-frame high dynamic range imaging is achieved. In some examples, the image segmentation module is a neural network model. In some embodiments, the image segmentation module can also be application-specific integrated circuit (ASIC) Module. The main workflow of the chip including image sensor is as follows:

Step 1: obtaining initial image data by imaging the target scene through the pixel array. In this step, low-resolution images of the target scene may be captured using a preset uniform exposure time, or the full-resolution image obtained in the previous frame may be used. The specific operation method may be determined according to the actual application scenario.

Step 2: processing the initial image data, segmenting the images of the whole imaging scene and extracting image features.

Step 3: based on the artificial intelligence algorithm, estimating the exposure time for the segmented image regions according to the image features extracted in step 2. And then setting a long exposure time for dark scene (for example: shadows, objects with low reflectivity); set a short exposure time for bright scene (for example: a place in direct sunlight, signal lights). In some embodiments, the artificial intelligence algorithm may be any suitable neural network.

Step 4: through the regional exposure control module, the target scene is photographed at full resolution according to the exposure time estimated in step 3.

Step 5: outputting a frame of HDR image data.

It should be noted that FIG. 3 only schematically shows the functional modules related to the image segmentation module and the regional exposure control module in the image sensor. A fully functional image sensor chip should also include addressing circuits, analog-to-digital conversion/digital-to-analog converters, memory, amplifier circuits, double sampling circuits, data output circuits, etc. These modules are not shown in the illustrations as they are well known in the industry.

The pixel-level exposure control method of the present disclosure realizes single-frame ultra-high dynamic range imaging, effectively reduces motion artifacts, and is suitable for high-speed photography. In addition, the resolution of the sensor will not be reduced, which is conducive to compatibility with small-size pixels, that is, the cost of the chips with the same resolution can be reduced.

Figure 4:
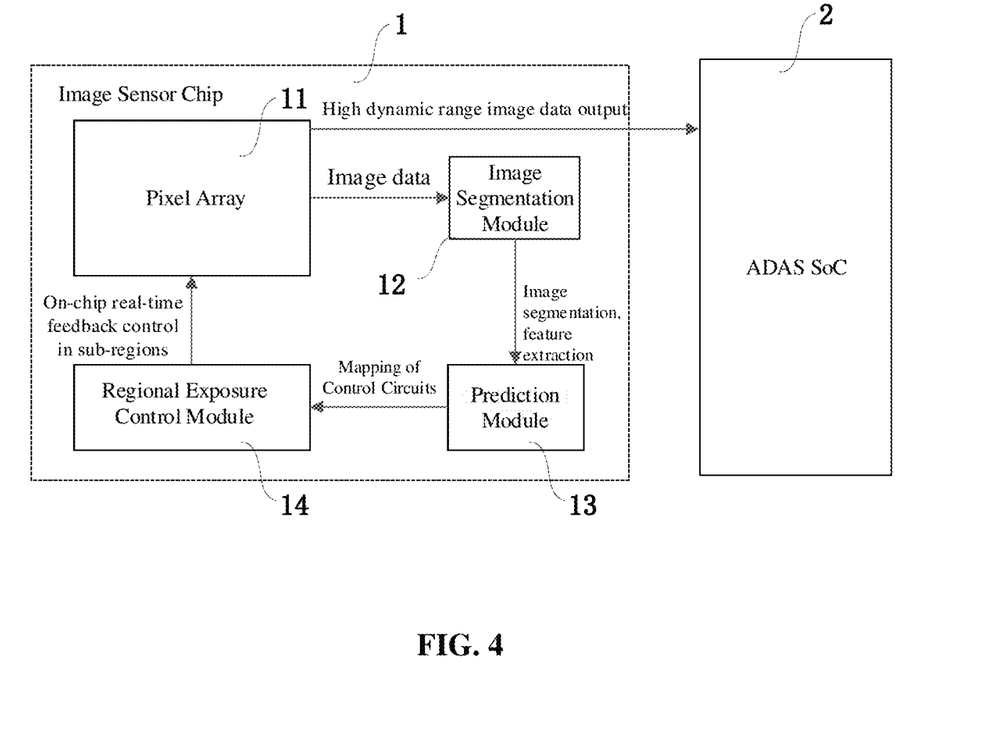
FIG. 4 is a module diagram of an image sensor according to an embodiment of the present disclosure.

FIG. 4 illustrates an application scenario of an image sensor in autonomous driving. Referring to FIG. 3 and FIG. 4, each sensor pixel in the pixel array 11 is exposed according to the exposure control signal to obtain the high dynamic image of the current frame. In one application scenario, after the step 5 described above, the high dynamic image is sent to chip 2 of the vehicle, for example to automotive system-on-chip (SoC) in advanced driver assistance systems (ADAS). After completing the partition exposure, the image sensor transmits the collected HDR image data to the system-on-chip (SoC) of the advanced driver assistance system (ADAS). In another application scenario, the high dynamic image is sent to chip 2 of the vehicle, for example to automotive system-on-chip (SoC) in autonomous driving for the subsequent use.

Figure 5:
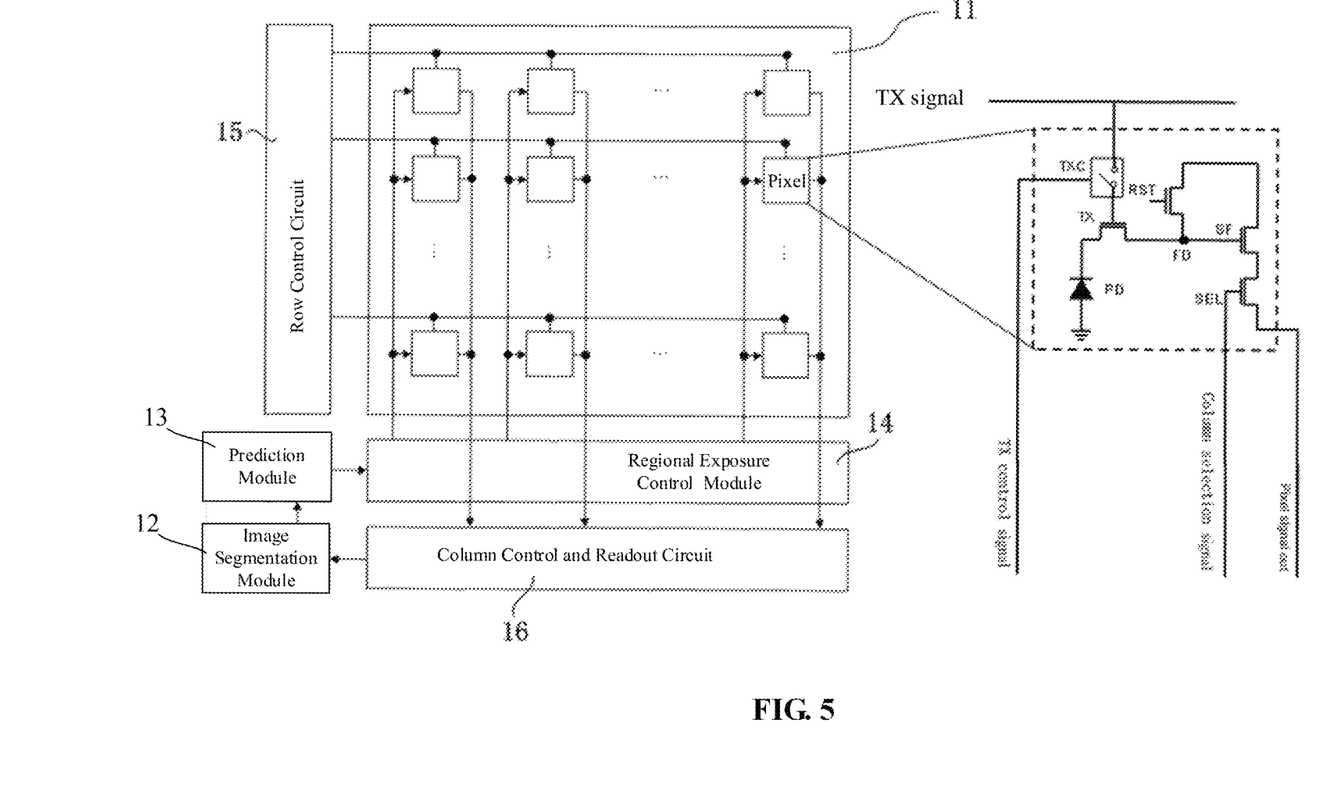
FIG. 5 is a schematic diagram of an image sensor of according to an embodiment of the present disclosure.

FIG. 5 is a schematic diagram of an image sensor of according to an embodiment of the present disclosure. As illustrated in FIG. 5, each sensor pixel of the two-dimensional pixel array 11 of image sensor receives the signal of row control circuit 15, and the signal of column control and readout circuit 16. Each sensor pixel includes a photodiode (PD), a floating diffusion (FD), a transfer transistor (TX) and a transfer gate control transistor unit (TXC). The transfer transistor (TX) is between the photodiode (PD) and the floating diffusion (FD). In this embodiment, the two transmission ends of the transmission gate control unit are respectively coupled to the gate of the transmission transistor (TX) and the row driving electrode, and the control end of the transmission gate control unit is coupled to the row control signal which ensure that the two transmission ends of transmission gate control unit based on row controlling signal are conductive or at an "on" status to adjust the exposure time. In this embodiment, a transfer gate control transistor (TXC) serves as the transfer gate control unit, the source or drain of the transfer gate control transistor (TXC) is coupled to the gate of the transfer transistor (TX), and the sensor pixels are configured that electrons accumulated by the photodiode during exposure are transferred to the floating diffusion (FD) only when the transfer transistor (TX) and the transfer gate control unit (e.g., TXC in this embodiment) are simultaneously turned on. In some embodiments, the transfer gate control unit may include more than one transistors. The reset transistor (RST) is configured to clear the electrons stored in the PD and the FD. The source follower transistor (SF) is configured to amplify the voltage signal generated by the FD. The selection transistor (SEL) is configured to select pixels from which signals are read, the gate of the selection transistor (SEL) receives a column selection signal, and the drain of the selection transistor (SEL) reads pixel signal out.

In some examples, the image segmentation module 12 inputs image data into an image segmentation neural network model, outputs a plurality of pixel partitions. Each pixel partition includes image pixels with same image features, and the image features include one or more of grayscale, color, spatial texture and geometric shape.

In some examples, the prediction module 13 obtains a predicted exposure time according to the image features of a pixel partition, and establishes a mapping relationship between the predicted exposure time and a sensor pixel in the pixel partition.

In some examples, the regional exposure control module 14 generates a pulse signal according to the predicted exposure time, a duration between falling edge and end of a cycle of the pulse signal is equal to the predicted exposure time, then sends each pulse signal to a sensor pixel that is mapped to the predicted exposure time, each of the sensor pixels is exposed according to the predicted exposure time included in the pulse signal.

In some examples, the image sensor further includes a first buffer, which buffers a dynamic image of a previous frame as the image data, and establishes a mapping relationship between each image pixel in the dynamic image of the previous frame and a sensor pixel. The regional exposure control module 14 sends an exposure control signal to a sensor pixel having a mapping relationship with the predicted exposure time.

In some examples, the image sensor further includes a second buffer, which buffers a low-resolution image data captured by part of pixels in the sensor, and establishes a mapping relationship between image pixels in captured image and sensor pixels according to positions of sensor pixels corresponding to the part of pixels in the image sensor. The regional exposure control module 14 sends an exposure control signal to a sensor pixel having a mapping relationship with the predicted exposure time.

Figure 6:
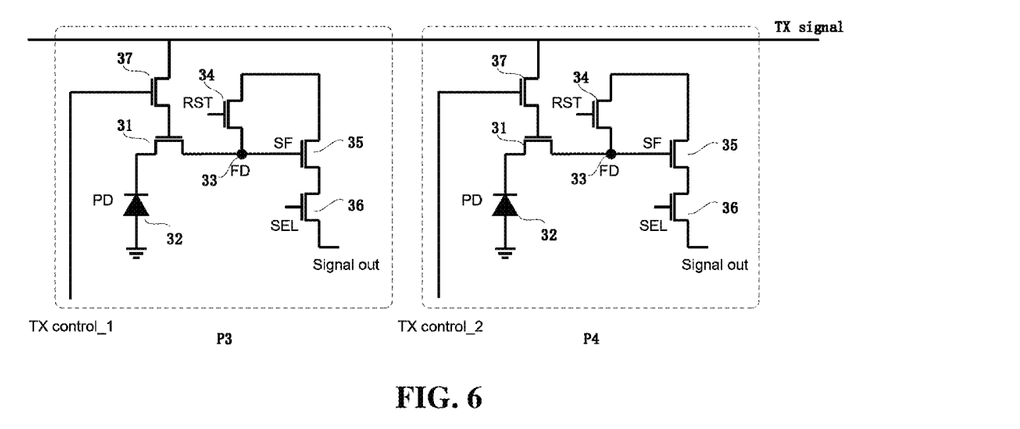
FIG. 6 is a schematic circuit diagram of an image sensor for pixel-level exposure control according to an embodiment of the present disclosure.
Figure 7:
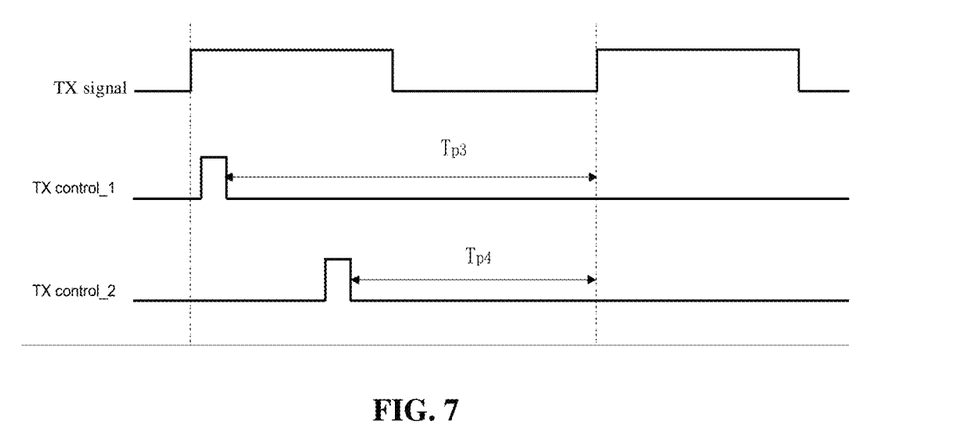
FIG. 7 is a schematic diagram of timing control of an image sensor for pixel-level exposure control according to an embodiment of the present disclosure.

FIG. 6 is a schematic circuit diagram of an image sensor for pixel-level exposure control according to an embodiment of the present disclosure. The present disclosure proposes a novel pixel structure. FIG. 6 shows two sensor pixels, P3 and P4. As shown in FIG. 6, a transfer gate control transistor (TXC) 37 serves as the transfer gate control unit, the source of the transfer gate control transistor (TXC) 37 is coupled to the gate of the transfer transistor (TX) 31, the drain of the transfer gate control transistor (TXC) is coupled to the row driving electrode, and the gate of the transfer gate control transistor (TXC) is coupled to the row control signal. The sensor pixels are configured such that the electrons accumulated by the photodiode (PD) during exposure are transferred to the floating diffusion region (FD) only when the transfer transistor (TX) 31 and the transfer gate control transistor (TXC) 37 are simultaneously turned on. In the illustrated embodiment, an additional control transistor (i.e., the transfer gate control transistor 37) is included in each pixel and is coupled to the gate of the TX transistor 31. FIG. 7 is a schematic diagram of timing control of the pixel-level exposure control sensor according to the present disclosure. As shown in FIG. 7, the actual exposure time of each pixel can be independently controlled through the TX signal and two TX control signals, thereby completing pixel-level exposure control. The actual exposure time of each pixel can be controlled independently through TX and TX control signals by the addition of the transfer gate control unit in the pixel. In this way, pixel-level exposure control is realized.

In some embodiments of the present disclosure, the image sensor with pixel-level exposure control in the image sensor includes: a first signal lead (TX signal), N pixels, N second signal leads and N transfer gate control transistor transistors 37. The first signal lead (TX signal) transmits a row scan signal. The N second signal leads transmit pulse signals corresponding to the predicted exposure times. The sources of each transfer gate control transistor 37 are all connected to the first signal lead, the gates are respectively connected to a second signal lead, and the drains are connected to the pixels. FIG. 6 illustrates two pixels, P3 and P4. That is, the N is two in the embodiment illustrated in FIG. 6. The pixels P3 and P4 have the same structure, and the P3 is described in detail.

The sensor pixel P3 comprises: a photodiode (PD) 32 for accumulating electrons generated by the photoelectric effect, a transfer transistor (TX) 31 for transferring electrons generated in PD 32 to floating diffusion (FD) 33, a reset transistor (RST) 34 for emptying stored electrons in the PD 32 and FD 33, a source follower (SF) 35 for amplifying the signal generated by the FD 33 and a select transistor (SEL) 36 for selecting the pixel to be read out.

As shown in FIG. 7, each pixel generates a photoelectric signal according to the predicted exposure time carried by the received pulse signal. Taking two adjacent pixels as an example, the first pixel P3 receives a first pulse signal from a first signal lead (TX control_1), and the second pixel P4 receives a second pulse signal from a second signal lead (TX control_2). In this embodiment, in one cycle, a duration between falling edge and end of the cycle of the pulse signal is equal to the predicted exposure time. The first pixel P3 starts to expose at the falling edge of the first pulse signal, and ends at the end of the period of the first pulse signal. The exposure time of the first pixel P3 is Tp3. The second pixel P4 starts to expose at the falling edge of the second pulse signal, and ends at the end of the period of the second pulse signal. The exposure time of the second pixel P4 is Tp4, and Tp4 is shorter than Tp3. Therefore, each pixel can control the exposure time based on various pulse signals, and can perform pixel-level regulation, so as to obtain single-frame ultra-high dynamic range image in one exposure.

The image sensor with pixel-level exposure of the present disclosure can realize single-frame ultra-high dynamic range imaging, effectively reduces motion artifacts, and is suitable for high-speed photography. In addition, the resolution of the sensor will not be reduced, which is conducive to compatibility with small-size pixels, and the cost of the chips with the same resolution can be reduced.

Figure 8:
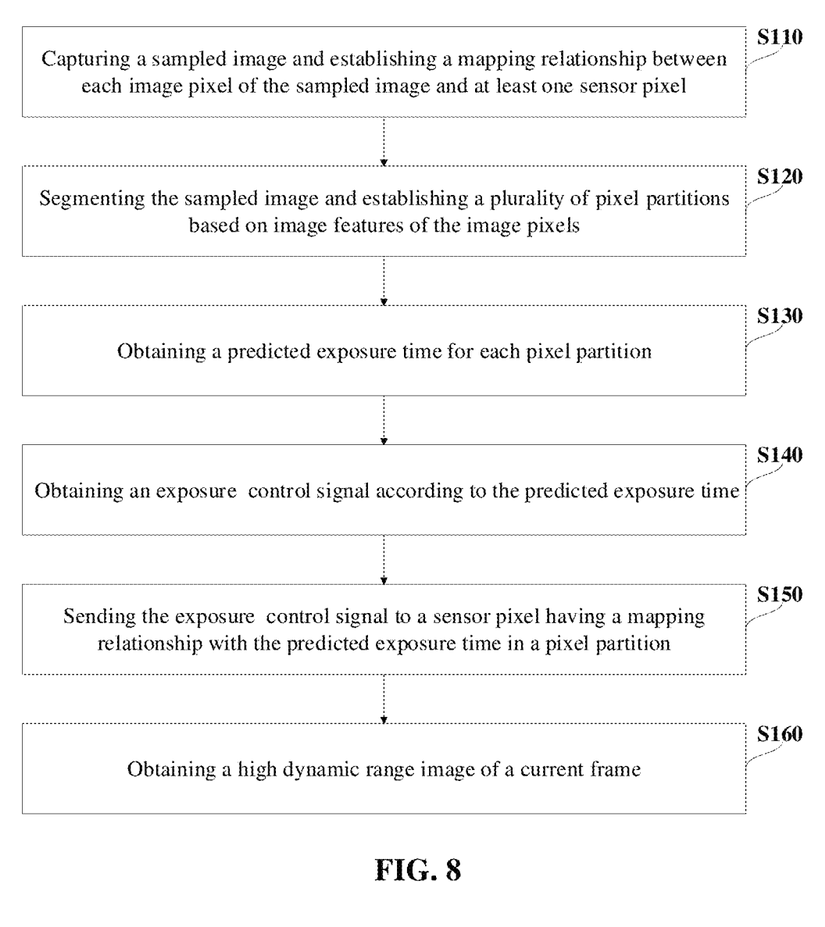
FIG. 8 is a flowchart of a pixel-level exposure control method according to an embodiment of the present disclosure.

FIG. 8 is a flowchart of a pixel-level exposure control method according to an embodiment of the present disclosure. As illustrated in FIG. 8, an embodiment of the present disclosure provides a pixel-level exposure control method. In this embodiment, the above-mentioned image sensor is used, but not limited thereto, and the method includes the following steps:

S110: capturing a sampled image, and establishing a mapping relationship between each image pixel of the sampled image and at least one sensor pixel;

S120: segmenting the sampled image and establishing a plurality of pixel partitions based on features of the brightness of the image pixels;

S130: obtaining a predicted exposure time for each pixel partition;

S140: obtaining an exposure control signal according to the predicted exposure time;

S150: sending the exposure control signal to a sensor pixel having a mapping relationship with the predicted exposure time in a pixel partition; and S160: obtaining a high dynamic range image of a current frame.

In the present disclosure, the predicted exposure time that each image pixel of the image sensor should adopt is obtained by performing exposure analysis on the sampled image, and the exposure control signal converted according to the predicted exposure time is sent to the corresponding sensor pixel, so that each sensor pixel can be exposed according to the corresponding predicted exposure time, and single-frame ultra-high dynamic range image can be obtained in one exposure.

Figure 9:
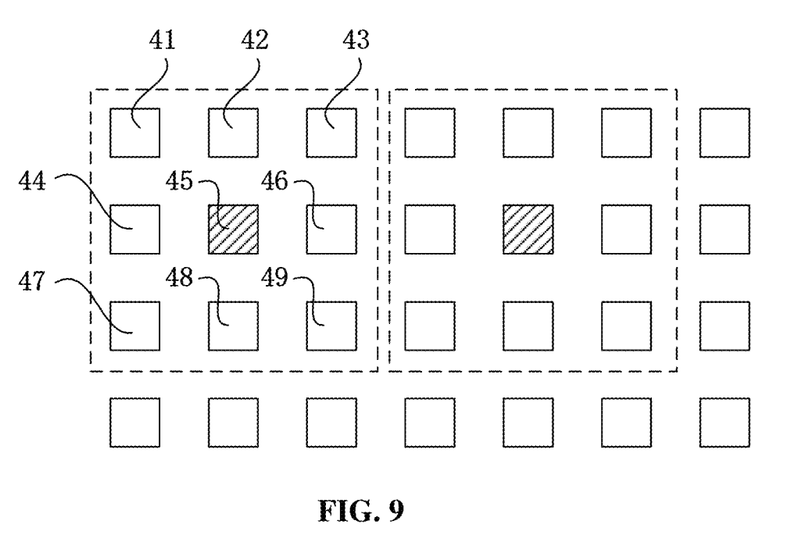
FIG. 9 and FIG. 10 are schematic diagrams of low-resolution sampling in a pixel-level exposure control method according to an embodiment of the present disclosure.
Figure 10:
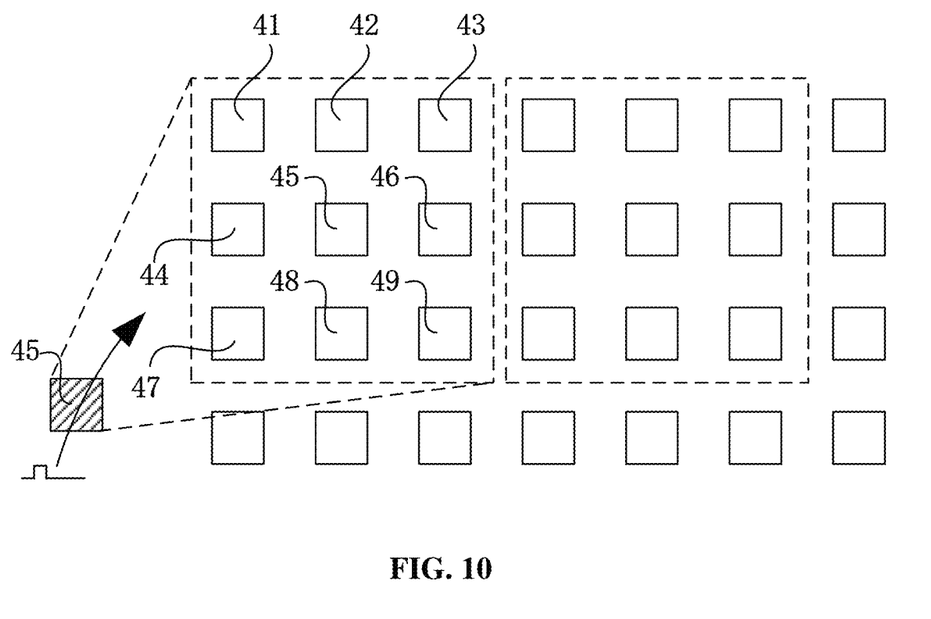

In some examples, the S110 step includes using part of pixels in the sensor to capture a low-resolution sampled image, and establishing the mapping relationship between each image pixel of the sampled image and sensor pixels according to the positions of the part of pixels in the image sensor. By first taking a sampled image, it is possible to analyze the light distribution according to the current lighting in real time, so as to obtain more accurate image data for predicting the exposure time and improve the accuracy of the exposure. The above method is not intended as a limitation. FIG. 9 and FIG. 10 are schematic diagrams of low-resolution sampling in a pixel-level exposure control method according to an embodiment of the present disclosure. As shown in FIG. 9, for each of the sensor pixels 41, 42, 43, 44, 45, 46, 47, 48 and 49 arranged in a nine-square grid in the image sensor, only the central sensor pixel 45 is used for sampling, and the remaining other eight sensor pixels are not participated in the sampling. This results in low-resolution image that contains only $\frac{1}{9}^{th}$ of the image pixels of the whole image sensor. Furthermore, a mapping relationship between the sensor pixel 45 and the sensor pixels 41, 42, 43, 44, 45, 46, 47, 48 and 49 arranged in a nine-square grid is established. The low-resolution image is used for subsequent steps such as image segmentation and prediction of exposure time. Since the sensor pixels are greatly reduced, the processing speed is accelerated. Since the light intensity of adjacent pixels is relatively similar, the method in the present disclosure can greatly reduce the calculation and speed up the processing with only a small loss of exposure accuracy. Subsequently, as shown in FIG. 10, the pulse signal corresponding to sensor pixel 45 can be sent to nine sensor pixels 41, 42, 43, 44, 45, 46, 47, 48 and 49 for exposure, so as to obtain real-time images with full-pixel high dynamic range based on low-resolution pre-sampling.

In some examples, the S110 step includes using a dynamic image of a previous frame as the sampled image, and establishing the mapping relationship between image pixels of the dynamic image of the previous frame and sensor pixels, which can be applied to photography. When applied to the high-speed photography, since the change of light intensity between adjacent frames is small, by multiplexing the dynamic image of the previous frame as a sampled image, no additional sampling is required. The image sensor is suitable for high-speed photography, but not limited thereto.

In some examples, the S120 step includes inputting the sampled image into an image segmentation neural network model and outputting a plurality of pixel partitions, wherein each pixel partition includes image pixels with same brightness. In this embodiment, the existing image segmentation neural network model based on pixel brightness may be used, for example, the parameter of pixel brightness can be obtained through the gray-scale range of each image pixel, so as to classify image pixels in different gray-scale ranges. The region where all the image pixels of one type of gray-scale range are located is a pixel partition (the image pixels in a pixel partition in this embodiment may not be adjacent), but not limited thereto. In some examples, the S120 step includes obtaining the parameters of each image pixel in the sampled image, and obtaining a brightness reference of each image pixel in the sampled image through weighted calculation, then allocating the image pixels to different pixel partitions, wherein each pixel partition corresponds to a preset independent range of brightness, but not limited thereto.

In some examples, the S130 step includes inputting each pixel partition respectively into an exposure module to obtain a predicted exposure time of each pixel partition. In this embodiment, a range of the predicted exposure time is $\frac{1}{10}$ second to $\frac{1}{1000}$ second, but not limited thereto.

In some examples, the S140 step includes generating a pulse signal according to the predicted exposure time, wherein a duration between falling edge and end of a cycle of the pulse signal is equal to the predicted exposure time.

In some examples, after step S160, the method further includes:

S170: identifying and partitioning obstacle in a dynamic image of the current frame through a trained neural network model; an image region to be identified or an image region whose confidence level is lower than a preset threshold is set as an exposure region to be adjusted, and a predicted exposure time of pixels in the exposure region is adjusted in a next frame. For example, exposure is increased or decreased, so that the trained neural network model can recognize and accurately label the entire dynamic image (including the adjusted image regions) of the next frame, which will improve the safety of driving or autonomous driving.

The present disclosure provides a pixel-level exposure control method, which realizes single-frame high dynamic range imaging. Motion artifacts are reduced since no multi-frame fusion (temporal multiple exposures) is required. This method controls the exposure time of each image pixel independently and does not require the fusion of spatial regional pixel data, as a result, the sacrifice of sensor resolution is avoided. At the same time, there is only one photodiode per pixel, small-sized pixels can be achieved by combining with the structure of existing stacked image sensor. Eventually, on the basis of the original dynamic range of common CIS, the dynamic range of the present disclosure can be greatly improved by (60-100 dB), and high dynamic range close to 200 dB can be achieved, which meets the requirements of autonomous driving and so on.

In summary, the purpose of the present disclosure is to provide an image sensor and a pixel-level exposure control method, which can realize single-frame ultra-high dynamic range imaging, effectively reduces motion artifacts, and is suitable for high-speed photography. In addition, the resolution of the sensor will not be reduced, which is conducive to compatibility with small-size pixels, that is, the cost of the chips with the same resolution can be reduced.

What is claimed is:

1. An image sensor comprising:
    a two-dimensional pixel array including a plurality of sensor pixels, wherein the sensor pixels are configured to collect image data of a target scene according to an adjustable exposure time;
    an image segmentation module configured to analyze image data collected by the two-dimensional pixel array, extract image features and establish a plurality of pixel partitions based on sensor pixels with same image features;
    a prediction module configured to obtain a predicted exposure time according to image features of pixel partitions; and
    a regional exposure control module configured to generate a control signal for an exposure time according to the predicted exposure time, and send the control signal to sensor pixels of a pixel partition corresponding to the predicted exposure time;
    wherein the sensor pixel comprises:
        a photodiode;
        a floating diffusion;
        a transfer transistor having a source and a drain coupled to the photodiode and the floating diffusion respectively; and
        a transfer gate control unit coupled to a gate of the transfer transistor, and the sensor pixels are configured such that electrons accumulated by the photodiode during exposure are transferred to the floating diffusion only when the transfer transistor and the transfer gate control unit are simultaneously turned on.

2. The image sensor according to claim 1, wherein the transfer gate control unit is a control circuit composed of a transistor or several transistors.

3. The image sensor according to claim 1, wherein the image segmentation module is configured to input the image data into an image segmentation neural network model, and output a plurality of pixel partitions, and wherein each pixel partition includes image pixels with same image features, and the image features include one or more of grayscale, color, spatial texture and geometric shape.

4. The image sensor according to claim 1, wherein the prediction module is configured to obtain a predicted exposure time according to the image features of a pixel partition, and establish a mapping relationship between the predicted exposure time and a sensor pixel in the pixel partition.

5. The image sensor to claim 4, wherein the regional exposure control module is configured to generate a pulse signal according to the predicted exposure time, wherein a duration between falling edge and end of a cycle of the pulse signal is equal to the predicted exposure time; and
    send each pulse signal to a sensor pixel that is mapped to the predicted exposure time, wherein each of the sensor pixels is exposed according to the predicted exposure time included in the pulse signal.

6. The image sensor according to claim 1, wherein the image sensor further comprises a first buffer, wherein the first buffer is configured to buffer a dynamic image of a previous frame as the image data, and establish a mapping relationship between each image pixel in the dynamic image of the previous frame and a sensor pixel; and
    wherein the regional exposure control module is configured to send an exposure control signal to a sensor pixel having a mapping relationship with the predicted exposure time.

7. The image sensor according to claim 1, wherein the image sensor further comprises a second buffer, wherein the second buffer is configured to buffer a low-resolution image data captured by part of pixels in the sensor, and establish a mapping relationship between image pixels in captured image and sensor pixels according to positions of sensor pixels corresponding to the part of pixels in the image sensor; and
    wherein the regional exposure control module is configured to send an exposure control signal to a sensor pixel having a mapping relationship with the predicted exposure time.

8. A pixel-level exposure control method comprising:
    capturing a sampled image and establishing a mapping relationship between each image pixel of the sampled image and at least one sensor pixel;
    segmenting the sampled image and establishing a plurality of pixel partitions based on image features of the image pixels;
    obtaining a predicted exposure time for each pixel partition and obtaining an exposure control signal according to the predicted exposure time; and
    sending the exposure control signal to a sensor pixel having a mapping relationship with the predicted exposure time in a pixel partition; and obtaining a high dynamic range image of a current frame;
    wherein obtaining the exposure control signal according to the predicted exposure time comprises generating a pulse signal according to the predicted exposure time, wherein a duration between falling edge and end of a cycle of the pulse signal is equal to the predicted exposure time.

9. The method according to claim 8, wherein capturing the sampled image and establishing the mapping relationship between each image pixel of the sampled image and at least one sensor pixel comprises:
    using a dynamic image of a previous frame as the sampled image, and establishing the mapping relationship between image pixels of the dynamic image of the previous frame and sensor pixels.

10. The method according to claim 8, wherein capturing the sampled image and establishing the mapping relationship between each image pixel of the sampled image and at least one sensor pixel comprises:
    using part of pixels in the sensor to capture a low-resolution sampled image, and establishing the mapping relationship between each image pixel of the sampled image and sensor pixels according to the positions of the part of pixels in the image sensor.

11. The method according to claim 8, wherein segmenting the sampled image and establishing a plurality of pixel partitions based on image features of the image pixels comprises:
    inputting the sampled image into an image segmentation neural network model and outputting a plurality of pixel partitions, wherein each pixel partition includes image pixels with a same brightness.

12. The method according to claim 8, wherein segmenting the sampled image and establishing a plurality of pixel partitions based on image features of the image pixels comprises:
  obtaining a brightness reference of each image pixel in the sampled image, and allocating the image pixels to different pixel partitions, wherein each pixel partition corresponds to a preset independent range of brightness reference.

13. The method according to claim 8, wherein obtaining the predicted exposure time for each pixel partition comprises:
  inputting each pixel partition respectively into an exposure module to obtain a predicted exposure time of each pixel partition, and a range of the predicted exposure time is $1/10$ second to $1/1000$ second.

14. The method according to claim 8, wherein the method further comprising:
  identifying and partitioning obstacle in a dynamic image of the current frame through a trained neural network model;
  wherein an identified image region or an image region whose confidence level is lower than a preset threshold is set as an exposure region to be adjusted, and a predicted exposure time of pixels in the exposure region is adjusted in a next frame.

* * * * *